(12) United States Patent
Bohlander et al.

(10) Patent No.: US 11,902,654 B2
(45) Date of Patent: Feb. 13, 2024

(54) DISPATCH-BASED RESPONDER CAMERA ACTIVATION

(71) Applicant: Axon Enterprise, Inc., Scottsdale, AZ (US)

(72) Inventors: Michael J. Bohlander, Seattle, WA (US); Raymond T. Fortna, Seattle, WA (US); Anthony G. Huang, Seattle, WA (US); Jeffrey P. Jolma, Seattle, WA (US); Aerianna K. Deluca, Seattle, WA (US); Julianne C. Weiss, Los Angeles, CA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

(21) Appl. No.: 17/834,861

(22) Filed: Jun. 7, 2022

(65) Prior Publication Data

US 2022/0303449 A1 Sep. 22, 2022

Related U.S. Application Data

(63) Continuation of application No. 16/436,781, filed on Jun. 10, 2019, now Pat. No. 11,356,591, which is a
(Continued)

(51) Int. Cl.
*H04N 23/661* (2023.01)
*H04N 5/77* (2006.01)
(Continued)

(52) U.S. Cl.
CPC ......... *H04N 23/661* (2023.01); *G06F 16/735* (2019.01); *G08B 13/19654* (2013.01);
(Continued)

(58) Field of Classification Search
None
See application file for complete search history.

(56) References Cited

U.S. PATENT DOCUMENTS

| 6,621,422 B2 | 9/2003 | Rubenstein |
| 7,034,678 B2 | 4/2006 | Burkley |

(Continued)

FOREIGN PATENT DOCUMENTS

| WO | 2006047597 | 5/2006 |
| WO | 2008027750 | 2/2009 |

OTHER PUBLICATIONS

European Patent Office, Extended European Search Report for European Application No. 15908459.9 dated May 21, 2019.
(Continued)

*Primary Examiner* — Quan Pham
(74) *Attorney, Agent, or Firm* — Andrew Graham

(57) ABSTRACT

A method of automatic activation of a responder camera to begin capturing a video can be performed by a computing device. The computing device receives an indication of a location or an event. The computing device determines a geographic area associated with the location or event. The computing device receives a dispatch acknowledgement from a responder, where the dispatch acknowledgement indicates that the responder is at the geographic area or that the responder is en route to the geographic area. The computing device automatically sends a camera activation signal to a responder camera associated with the responder in response to receiving the dispatch acknowledgement from the responder. The responder camera is configured to begin capturing a video in response to receiving the camera activation signal.

20 Claims, 8 Drawing Sheets

Related U.S. Application Data continuation of application No. 14/939,543, filed on Nov. 12, 2015, now Pat. No. 10,321,039.

(51) Int. Cl.

| | | |
|---|---|---|
| *G08B 13/196* | (2006.01) | |
| *G06F 16/735* | (2019.01) | |
| *H04N 23/63* | (2023.01) | |
| *H04W 76/50* | (2018.01) | |

(52) U.S. Cl.
CPC ............... *H04N 5/77* (2013.01); *H04N 23/63* (2023.01); *H04W 76/50* (2018.02)

(56) References Cited

U.S. PATENT DOCUMENTS

| | | |
|---|---|---|
| 7,091,851 B2 | 8/2006 | Mason |
| 7,091,852 B2 | 8/2006 | Mason |
| 7,158,026 B2 | 1/2007 | Feldkamp |
| 7,177,623 B2 | 2/2007 | Baldwin |
| 7,245,216 B2 | 7/2007 | Burkley |
| 7,508,840 B2 | 3/2009 | Delaney |
| 7,652,571 B2 | 1/2010 | Parkulo |
| 7,881,862 B2 | 2/2011 | Pei |
| 7,925,246 B2 | 4/2011 | McKibben |
| 8,013,734 B2 | 9/2011 | Saigh |
| 8,260,338 B2 | 9/2012 | Shaffer |
| 8,275,404 B2 | 9/2012 | Berger |
| 8,368,754 B2 | 2/2013 | Flores |
| 8,504,090 B2 | 8/2013 | Klein |
| 8,520,700 B2 | 8/2013 | Greene |
| 8,526,934 B2 | 9/2013 | Sennett |
| 8,665,087 B2 | 3/2014 | Greene |
| 8,873,719 B2 | 10/2014 | Clawson |
| 9,125,041 B2 | 9/2015 | Greene |
| 9,767,677 B1 | 9/2017 | Paulin |
| 2003/0028536 A1 | 2/2003 | Singh |
| 2004/0179092 A1 | 9/2004 | Lapoint |
| 2007/0103292 A1 | 5/2007 | Burkley |
| 2007/0250348 A1 | 10/2007 | D'Ambrosia |
| 2008/0037461 A1 | 2/2008 | Biltz |
| 2008/0115174 A1 | 5/2008 | Nicholl |
| 2008/0181132 A1 | 7/2008 | Underhill |
| 2009/0284348 A1* | 11/2009 | Pfeffer ............... G08B 25/006 340/7.3 |
| 2010/0009700 A1 | 1/2010 | Camp, Jr. et al. |
| 2010/0274816 A1 | 10/2010 | Guzik |
| 2011/0018998 A1 | 1/2011 | Guzik |
| 2011/0281547 A1 | 11/2011 | Cordero |
| 2013/0005294 A1 | 1/2013 | Levinson |
| 2013/0182138 A1 | 7/2013 | Cho |
| 2013/0184035 A1 | 7/2013 | Roberts, Sr. et al. |
| 2013/0342361 A1 | 12/2013 | Greene |
| 2014/0243036 A1 | 8/2014 | Kouwe |
| 2015/0066557 A1 | 3/2015 | Lichti |
| 2015/0086175 A1 | 3/2015 | Lorenzetti |
| 2015/0195493 A1 | 7/2015 | Childers |
| 2015/0289122 A1 | 10/2015 | Friesen |
| 2015/0347079 A1 | 12/2015 | Price |
| 2016/0042767 A1 | 2/2016 | Araya |
| 2016/0094773 A1 | 3/2016 | Macluca |
| 2016/0119515 A1 | 4/2016 | Phillips et al. |
| 2016/0179900 A1 | 6/2016 | Stefik et al. |
| 2016/0366327 A1 | 12/2016 | Kusens |
| 2017/0124505 A1 | 5/2017 | Nakfour |

OTHER PUBLICATIONS

European Patent Office, Communication Pursuant to Article 94(3) EPC, for European Application No. 15908459.9 dated Jun. 5, 2020.
European Patent Office, Communication Pursuant to Article 94(3) EPC, for European Application No. 15908459.9 dated Sep. 9, 2021.

* cited by examiner

DISPATCH-BASED RESPONDER CAMERA ACTIVATION

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a method of activating a responder camera includes a computing device receiving an indication of a location or an event, determining a geographic area associated with the location or event, receiving a dispatch acknowledgement from a responder, and automatically sending a camera activation signal to a responder camera associated with the responder in response to receiving the dispatch acknowledgement from the responder. The dispatch acknowledgement indicates that the responder is at the geographic area or that the responder is en route to the geographic area. The responder camera is configured to begin capturing a video in response to receiving the camera activation signal.

In one example, the method further includes the computing device sending a dispatch request to the responder prior to receiving the dispatch acknowledgement from the responder. In another example, the method further includes the computing device receiving the video from the responder camera. In another example, the video is received from the responder camera after the responder camera has finished capturing the video. In another example, the video is received from the responder camera as a streaming video. In another example, at least a portion of the streaming video is received from the responder camera before the responder camera finishes capturing the video. In another example, the method further includes the computing device storing the video received from the responder camera.

In another example, the dispatch acknowledgement is received from the responder via a responder computing device associated with the responder. In another example, automatically sending the camera activation signal to the responder camera associated with the responder comprises automatically sending, by the computing device, the camera activation signal to the responder computing device, where the responder computing device is configured to relay the camera activation signal to the responder camera. In another example, receiving the dispatch acknowledgement from the responder comprises receiving, by the computing device, the dispatch acknowledgement from the responder via a device other than the responder computing device. In another example, automatically sending the camera activation signal to the responder camera associated with the responder comprises automatically sending, by the computing device, the camera activation signal directly to the responder camera activation signal via one or more communication networks.

In another example, the dispatch acknowledgement indicates that the responder is en route to the geographic area, and wherein automatically sending the camera activation signal to the responder camera causes the responder camera to begin capturing the video prior to the responder arriving at the geographic area. In another example, the method further includes the computing device receiving the video from the responder camera as a streaming video, where at least a portion of the streaming video is received from the responder camera prior to the responder arriving at the geographic area.

In another example, the dispatch acknowledgement includes geospatial information of one or more of the responder camera or a responder computing device associated with the responder. In another example, the method further includes the computing device sending camera activation signals to a plurality of responder cameras in response to determining that each of a plurality of responders associated with the plurality of responder cameras is at the geographic area or en route to the geographic area. In another example, the method further includes the computing device receiving a streaming video from each of the plurality of responder cameras and simultaneously displaying at least two streaming videos received from the plurality of responder cameras.

In another embodiment, a non-transitory computer-readable medium has instructions embodied thereon for activating a responder camera, where the instructions, in response to execution by a computing device, cause the computing device to receive an indication of a location or an event, determine a geographic area associated with the location or event, receive a dispatch acknowledgement from a responder, and automatically send a camera activation signal to a responder camera associated with the responder in response to receiving the dispatch acknowledgement from the responder. The dispatch acknowledgement indicates that the responder is at the geographic area or that the responder is en route to the geographic area. The responder camera is configured to begin capturing a video in response to receiving the camera activation signal.

In another embodiment, a computing device for activating a responder camera includes a processor and a computer-readable medium having instructions embodied thereon. The instructions, in response to execution by the processor, cause the computing device to receive an indication of a location or an event, determine a geographic area associated with the location or event, receive a dispatch acknowledgement from a responder, and automatically send a camera activation signal to a responder camera associated with the responder in response to receiving the dispatch acknowledgement from the responder. The dispatch acknowledgement indicates that the responder is at the geographic area or that the responder is en route to the geographic area. The responder camera is configured to begin capturing a video in response to receiving the camera activation signal.

In another example, the computing device further includes at least one display device and the instructions, in response to execution by the processor, further cause the computing device to receive the video from the responder camera and display the received video on the at least one display device. In another example, the computing device further includes at least one memory and the instructions, in response to execution by the processor, further cause the computing device to receive the video from the responder camera and store the received video in the at least one memory.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
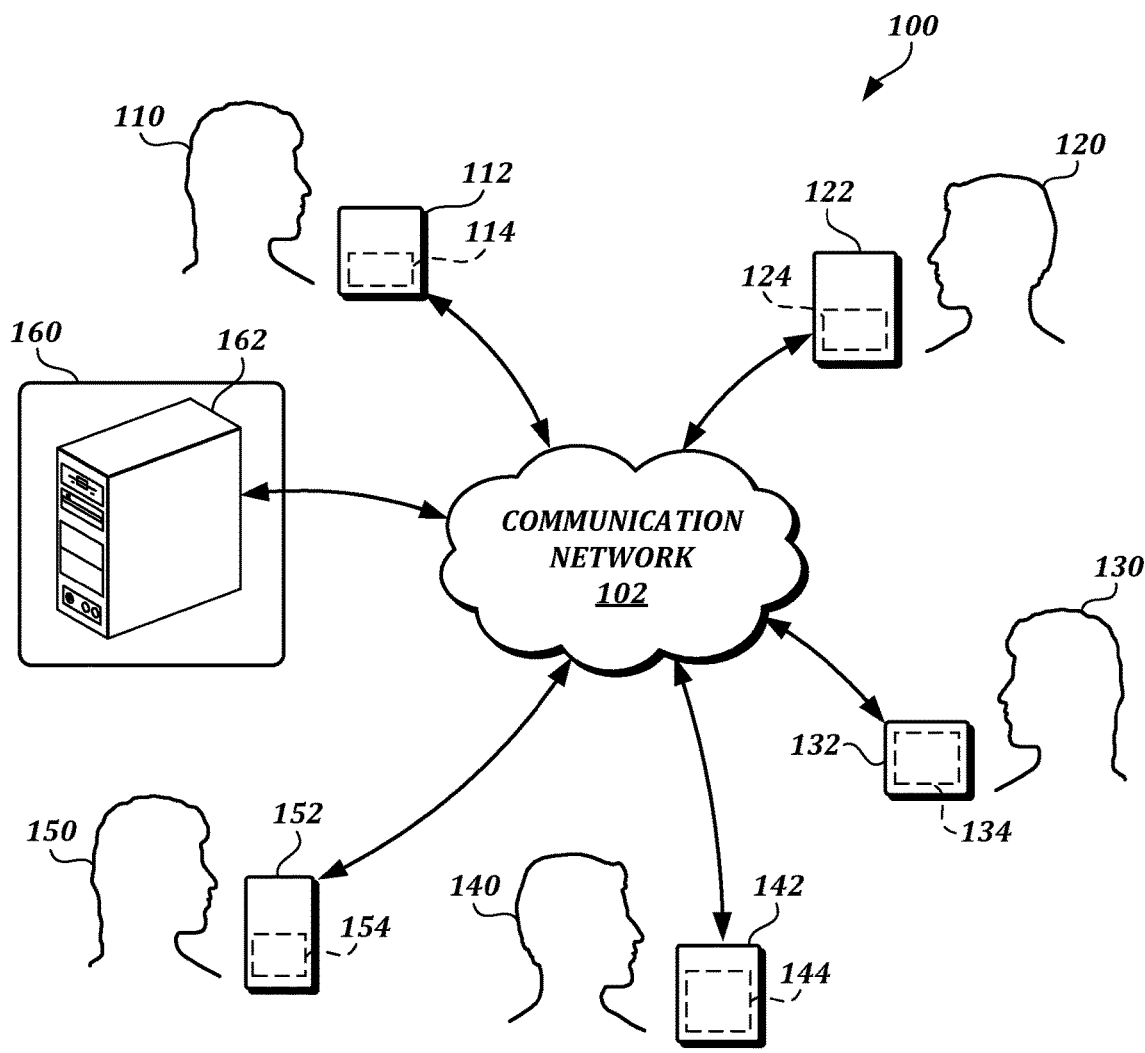
FIG. 1 depicts an embodiment of a system for communication between computing devices of responders via a network, in accordance with the embodiments disclosed herein.

Video recordings are important records for responders and responder agencies. A responder is any individual that is part of an agency that responds to particular situations. Examples of responders include law enforcement officials, firefighting officials, paramedics, private security personnel, private responders (e.g., tow truck drivers and roadside assistance personnel), and the like. Law enforcement officials include police officers, sheriffs and sheriff deputies, state patrol officers, federal agency officers (e.g., Federal Bureau of Investigation agents, Central Intelligence Agency agents, Transportation Security Administration officers, etc.), members of the National Guard, members of the armed forces, and the like. Examples of responders also include supervisors and dispatchers of other responders. Examples of responder agencies include police departments, sheriff offices, fire departments, federal agencies, private companies of private security personnel, private responder organizations, and the like.

Videos associated with responder activities have a number of uses. For example, videos have evidentiary value, such as evidence of criminal activities that occur near responders, evidence of proper actions by responders, evidence of responder malfeasance, evidence of actions of individuals interacting with responders, and the like. Because of the evidentiary value of video, the number of responder cameras (e.g., cameras under the control of a responder or a responder agency) has increased. Examples of responder cameras include dashboard cameras in responder vehicles, body cameras worn by responders, and the like.

One difficulty associated with the use of responder cameras is controlling the times at which the responder cameras capture video. In one example, a responder camera captures video constantly while the associated responder is on duty. While this example would capture any video of potential evidentiary value while the responder is on duty, constant capture of video by a responder camera has a number of disadvantages. Constant use of a responder camera results in a constant draw of power, which is especially problematic for responder cameras powered by batteries, generates a significant amount of video data, that must be stored and maintained securely, and creates a number of other issues.

In another example controlling the times at which the responder cameras capture video, a responder camera captures video when activated manually by a responder. In this example, the responder activates the responder camera to begin recording video when the responder determines to activate the responder camera, such as when the responder is pursuing a suspect, the responder is responding to a call, and the like. However, relying on manual activation of a responder camera leaves significant room for human error, such as in situations where a responder forgets to activate the responder camera, in situations where a responder does not deem a situation to be appropriate for video recording but video evidence would have been helpful, in situations where a responder intentionally fails to activate the responder camera to avoid evidence of malfeasance, and the like.

Due to the disadvantages of controlling the times at which the responder cameras capture video described above, an automated method of activating responder cameras in needed to avoid the disadvantages of constantly capturing video or relying on manual activation by responders. Embodiments of the present disclosure are generally directed to automatically activating responder cameras in response to particular situations.

In one or more embodiments disclosed herein, a computing device (e.g., a dispatch computing device) receives an indication of a location or event. In some examples, a dispatcher enters the indication of a location (e.g., an address, an intersection, etc.) or an event (e.g., a gathering of people, a demonstration route, an ongoing vehicle chase of a suspect, etc.). The computing device determines a geographic area associated with the location or event (e.g., a radius from a location, an area surrounding the event, an expected future path of the event, etc.). The computing device receives a dispatch acknowledgement from a responder indicating that the responder is at the geographic area or that the responder is en route to the geographic area. Such a determination may be made based on geolocation coordinates of a present or intended future location of the responder contained in the dispatch acknowledgement from the responder. In response to receiving the dispatch acknowledgement from the responder, the computing device automatically sends a camera activation signal to a responder camera associated with the responder. The responder camera is configured to begin capturing a video in response to receiving the camera activation signal. In this way, the receipt of the dispatch acknowledgement from the responder indicating that the responder is at the geographic area or that the responder is en route to the geographic area triggers the computing device to automatically activate the responder camera.

In the following description, numerous specific details are set forth in order to provide a thorough understanding of illustrative embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein. The illustrative examples provided herein are not intended to be exhaustive or to limit the claimed subject matter to the precise forms disclosed.

FIG. 1 depicts an embodiment of a system 100 for communication between computing devices of responders via a network 102. The system 100 includes a responder 110 that has a computing device 112. The computing device 112 is capable of communicating via the network 102. In some embodiments, the network 102 is a wireless communication network using one or more wireless communication protocols, such as WiFi, 2G, 3G, 4G, LTE, WiMAX, Bluetooth, and the like. In some embodiments, the network 102 includes a number of different communication networks, such as a wireless network and a local area network (LAN). In the depicted embodiment, the computing device 112 includes a communication application 114 that includes instructions that cause the computing device 112 to communicate with other computing devices via the network 102.

The system 100 also includes responders 120, 130, 140, and 150. Each of the responders 120, 130, 140, and 150 has one of computing devices 122, 132, 142, and 152 that is capable of communicating via the network 102. Each of the computing devices 122, 132, 142, and 152 includes one of the communication applications 124, 134, 144, 154 that includes instructions that cause the computing devices 122, 132, 142, and 152 to establish a communication link between computing devices of other responders via the network 102.

In the depicted embodiment, the system 100 also includes a dispatch unit 160 that includes a computing device 162. In some examples, the computing device 162 includes one or more of a server, a desktop computer, a laptop computer, a tablet computer, and the like. The computing device 162 is capable of communicating via the network 102. The computing device 162 includes a communication application that includes instructions that cause the computing device 162 to establish a communication link between computing devices of other responders via the network 102. In one embodiment, the computing device 162 is used by a responder, such as a dispatcher, a supervisory responder, or any other type of responder.

In some embodiments, each of the computing devices 112, 122, 132, 142, 152, and 162 includes one or more of a cell phone, tablet computer, smart wearable (e.g., a smart watch), a laptop computer, a desktop computer, and the like. In one example, the computing devices 112, 122, 132, 142, and 152 are personal devices of the responders 110, 120, 130, 140, and 150 and are not issued by any responder agency of the responders 110, 120, 130, 140, and 150. In that case, the communication applications 114, 124, 134, 144, and 154 are configured to enable communication between the personal computing devices 112, 122, 132, 142, and 152 of the responders 110, 120, 130, 140, and 150 with each other and with computing devices of one or more responder agencies, such as computing device 162.

In another example, when communicating via the network 102, the computing devices 112, 122, 132, 142, 152, and 162 are capable of sending communications directly to another of the computing devices 112, 122, 132, 142, 152, and 162 (i.e., direct communication), to a subset of the computing devices 112, 122, 132, 142, 152, and 162 (i.e., selective communication), or to all of the computing devices 112, 122, 132, 142, 152, and 162 (i.e., broadcast communication). In some embodiments, communications are sent between one or more of the computing devices 112, 122, 132, 142, 152, and 162 via a communication link based on a priority rank among at least two of the responders 110, 120, 130, 140, and 150.

In some embodiments, the responders 110, 120, 130, 140, and 150 are all associated with the same responder agency. Examples of responders from the same responder agency include police officers from the same police department, firefighters from the same fire department, private security personnel from the same organization, and the like. In other embodiments, at least some of the responders 110, 120, 130, 140, and 150 are associated with different responder agencies. Examples of responders from different responder agencies include police officers from one police department and police officers from another police department, state patrol officers and sheriffs deputies, federal agency agents and members of the armed forces, and the like.

Figure 2:
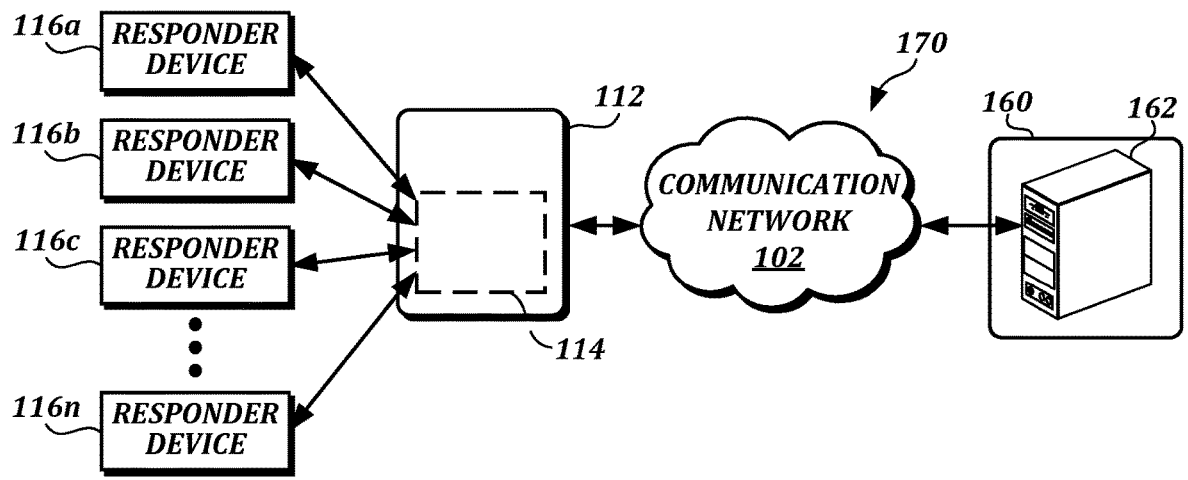
FIG. 2 depicts an embodiment of a system and examples of communication capabilities of a responder computing device, in accordance with the embodiments disclosed herein.

An embodiment of a system 170 and examples of communication capabilities of the computing device 112 are depicted in FIG. 2. The system 170 includes the computing device 112, the network 102, the dispatch unit 160, and the dispatch computing device 162. As described above, the computing device 112 includes the communications application 114 and is capable of communicating via the network 102. The computing device 112 is also capable of communicating with any number of responder devices 116a-n. Examples of the responder devices 116a-n include devices worn or carried by the responder 110, such as a responder camera (e.g., an on-body camera, a dashboard camera, etc.), a conducted electrical weapon (CEW), a firearm holster, an on-body microphone, a radio, and the like. Other examples of the responder devices 116a-n include devices associated with a vehicle of the responder 110, such as a light bar, a dashboard camera, a microphone, an in-vehicle sensor, and the like. The responder devices 116a-n can include any other device associated with the responder 110.

In some embodiments, the communications application 114 includes instructions that, when executed, cause the computing device 112 to communicate, via the network 102, with the dispatch computing device 162 or any other computing device in communication with the network 102. In some examples, the computing device 112 communicates via the network 102 using one or more wireless communication protocols, such as 2G, 3G, 4G, LTE, or WiMAX. In some embodiments, the communications application 114 includes instructions that, when executed, cause the computing device 112 to communicate directly with one or more of the responder devices 116a-n. In some examples, the computing device 112 communicates directly with one or more of the responder devices 116a-n using one or more wireless communication protocols, such as WiFi, Bluetooth, or near field communication (NFC).

In some embodiments, the communications application 114 includes instructions that, when executed, cause the computing device 112 to send communications to the dispatch computing device 162 via the network 102. In some examples, the communications sent by the computing device 112 to the dispatch computing device 162 via the network 102 include information obtained or generated by the computing device 112. For example, communications from the computing device 112 may include audio recorded by the computing device 112, geolocation data determined by the computing device 112, environmental data (e.g., temperature, atmospheric pressure, etc.), and the like.

In some embodiments, the communications application 114 includes instructions that, when executed, cause the computing device 112 to relay communications between the dispatch computing device 162 and the responder devices 116a-n. In some examples, the communications can include video from an on body camera, audio from an on-body microphone, an indication from a light bar of a vehicle that the light bar has been activated, an indication from a holster that the holster has been unlocked to allow removal of a firearm, an indication from a biometric sensor (e.g., heart rate monitor, body temperature sensor, blood pressure sensor, etc.) of biometric data about the responder 110, and the like. In some embodiments, the computing device 112 communicates with one or more of the responder devices 116a-n using a first wireless communication protocol (e.g., WiFi, Bluetooth, etc.) and the computing device 112 communicates via the network 102 using a second wireless communication protocol (e.g., 2G, 3G, 4G, LTE, WiMAX, etc.).

In another embodiment, the communications application 114 includes instructions that, when executed, cause the computing device 112 to process information prior to sending it via the network 102. In one example, the communications application 114 causes the computing device 112 to reduce a resolution of the information (e.g., pictures, recorded video, video streams, etc.) prior to sending the information via the network 102. In another example, the communications application 114 causes the computing device 112 to tag the information with metadata (e.g., a time of capture of the information, a location of capture of the information, etc.) prior to sending the information via the network 102. In another example, the communications application 114 causes the computing device 112 to compile multiple forms of information (e.g., text and images) into a single transmission via the network 102.

The depiction in FIG. 2 includes an embodiment of the computing device 112. However, this embodiment is not limited only to the computing device 112. Any of the other computing devices described herein, such as computing devices 122, 132, 142, 152, and 162, may have similar capabilities to communicate via the network 102 and to communicate with responder devices associated with the computing devices.

Figure 3:
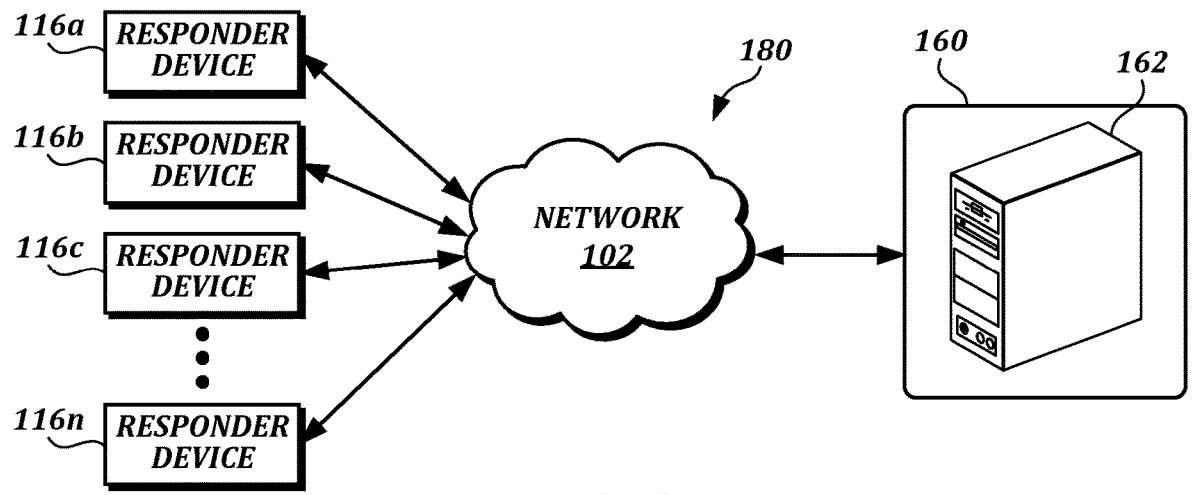
FIG. 3 depicts an embodiment of a system and examples of communication capabilities of a responder devices, in accordance with the embodiments disclosed herein.

An embodiment of a system 180 and examples of communication capabilities of the responder devices 116a-n are depicted in FIG. 3. Each of the responder devices 116a-n is configured to communicate, via the network 102, with the dispatch computing device 162 or any other computing device in communication with the network 102. In some examples, the responder devices 116a-n communicate via the network 102 using one or more wireless communication protocols, such as 2G, 3G, 4G, LTE, or WiMAX. In some embodiments, the communication between the responder devices 116a-n and the dispatch computing device 162 includes either or both of communication from the responder devices 116a-n to the dispatch computing device 162 (e.g., video information, audio information, responder device status information, biometric data, geolocation information, etc.) and communication from the dispatch computing device 162 to the responder devices 116a-n (e.g., an activation signal to activate one of the responder devices 116a-n).

In both the embodiments of systems 170 and 180 depicted in FIGS. 2 and 3, the responder devices 116a-n and the dispatch computing device 162 are capable of communicating with each other. In another embodiment, the responder devices 116a-n and the dispatch computing device 162 are capable of communicating with each other using a hybrid of the systems 170 and 180 depicted in FIGS. 2 and 3. In one embodiment, one of the responder devices 116a-n and the dispatch computing device 162 communicate via the network 102, as shown in FIG. 3, to communicate low-bandwidth messages (e.g., a sensor reading from one of the responder devices 116a-n to the dispatch computing device 162, an activation message from the dispatch computing device 162 to the one of the responder devices 116a-n, etc.) and the responder devices 116a-n and the dispatch computing device 162 communicate via computing device 112 and the network 102, as shown in FIG. 2, to communicate high-bandwidth messages (e.g., video information from one of the responder devices 116a-n to the dispatch computing device 162, etc.). Any other combination of using the two systems 170 and 180 depicted in FIGS. 2 and 3 is possible.

Communications between a responder device and a dispatch computing system can be used to automatically activate the responder device. An example of automatic activation of a responder camera 116m using a system 200 is depicted in FIGS. 4 to 6B. The system 200 includes the responder, the network 102, and the dispatch unit 160. The responder 110 has the computing device 112 with the communications application 114 and the responder 110 has the responder camera 116a. While the responder camera 116m depicted in FIGS. 4 to 6B is an on-body camera, the responder camera 116m can be any type of responder camera, such as a dashboard camera in a responder vehicle. The dispatch unit 160 includes the dispatch computing device 162. The embodiments of methods shown in FIGS. 4 to 6B depict examples of a dispatch computing system 162 automatically activating the responder camera 116m.

Figure 4:
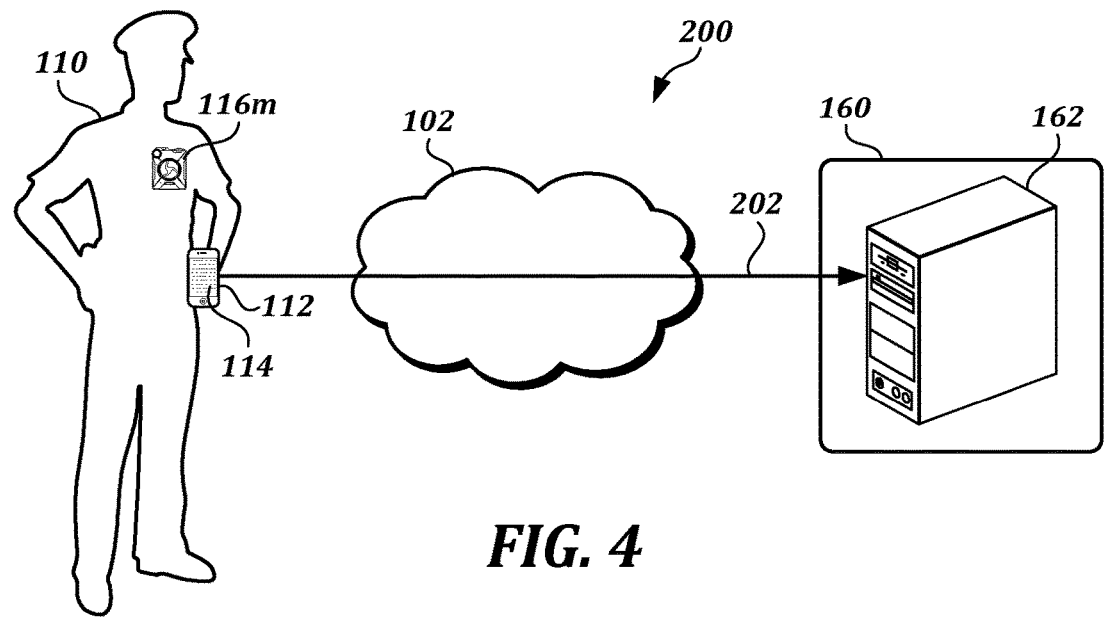
FIG. 4 depicts a system in which a dispatch computing system receives a dispatch acknowledgement from a responder, in accordance with the embodiments disclosed herein.

In FIG. 4, the dispatch computing system 162 receives a dispatch acknowledgement 202. The dispatch acknowledgement 202 indicates that the responder 110 is at a geographic area or en route to a geographic area. In one embodiment, the dispatch computing system 162 previously received an indication of a location or event and determined the geographic area associated with the location or event.

In the embodiment shown in FIG. 4, the dispatch computing system 162 receives the dispatch acknowledgement 202 from the computing device 112 via the network 102. In this embodiment, the computing device 112 may send the dispatch acknowledgement 202 in response to an input from the responder 110 accepting dispatch instructions to respond to the location or event or to respond to the geographic area. In one embodiment, the computing device 112 adds information to the dispatch acknowledgement 202 before sending the dispatch acknowledgement 202, such as geospatial information indicating the current location of the computing device 112 or an intended destination of the responder 110.

In some embodiments not shown in FIG. 4, the dispatch computing system 162 is capable of receiving the dispatch acknowledgement 202 from the responder in other ways. In one embodiment, the responder 110 communicates with a dispatcher, such as via a two-way radio system, to accept a dispatch request and to provide the dispatcher with a current location and/or intended destination of the responder 110. The dispatcher enters the dispatch acknowledgement 202 into the dispatch computing system 162 with an indication that the responder 110 is at the geographic area or that the responder 110 is en route to the geographic area. There are any number of other ways by which the responder 110 provides information that is received by the dispatch computing system 162 as the dispatch acknowledgement 202.

In response to receiving the dispatch acknowledgement 202, the dispatch computing system 162 automatically sends a camera activation signal to the responder camera 116m associated with the responder 110. The responder camera 116m is configured to begin capturing a video in response to receiving the camera activation signal. In this way, by the dispatch computing system 162 sending the camera activation signal in response to receiving the dispatch acknowledgement 202 indicating that the responder 110 is at the geographic area or that the responder is en route to the geographic area, the responder camera 116m is automatically activated to capture video of events happening at and/or en route to the geographic area. Two embodiments of the dispatch computing system 162 automatically sending a camera activation signal to the responder camera 116m associated with the responder 110 are depicted in FIGS. 5A and 5B.

Figure 5A:
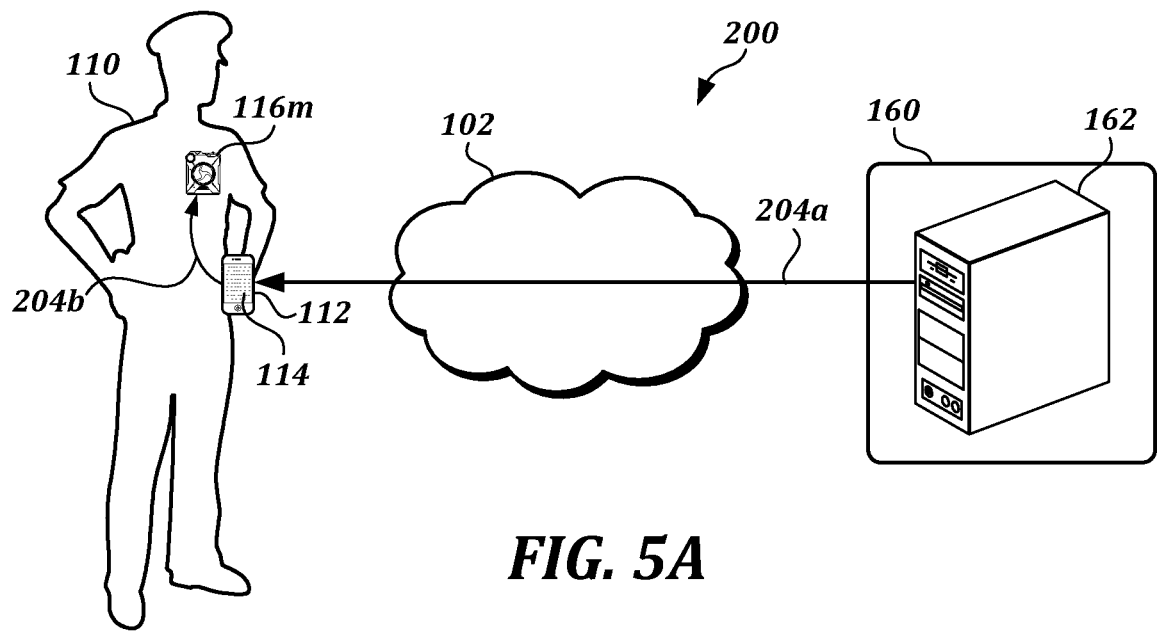
FIGS. 5A and 5B depict embodiments of automatically sending a camera activation signal to a responder camera associated with the responder in the system depicted in FIG. 4, in accordance with the embodiments disclosed herein.

In the embodiment shown in FIG. 5A, the dispatch computing system 162 automatically sends a camera activation signal 204a to the computing device 112 via the network 102 and the computing device 112 sends a camera activation signal 204b to the responder camera 116m. In response to receiving the camera activation signal 204b, the responder camera 116m begins capturing a video. In this way, the automatic sending of the camera activation signal 204a by the dispatch computing system 162 causes the responder camera 116m to begin capturing a video. The camera activation signal 204b may be the same as the camera activation signal 204a or the camera activation signal 204b may be a modified version of the activation signal 204a (e.g., in the case where the computing device 112 processes the camera activation signal 204a to generate the camera activation signal 204b).

Figure 5B:
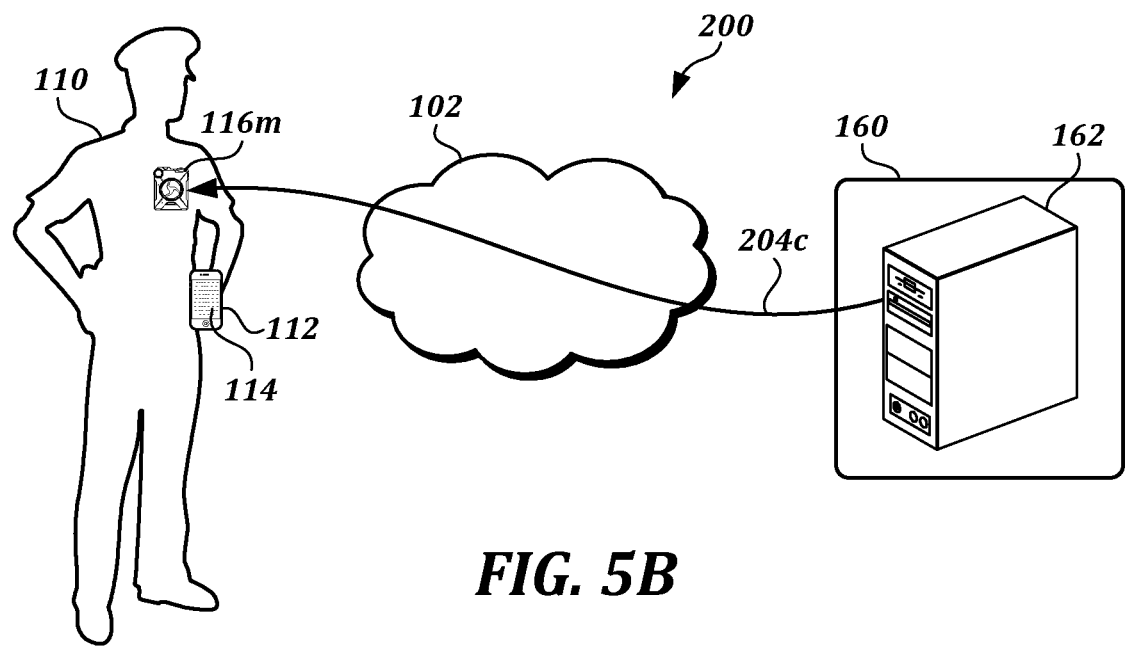

In the embodiment shown in FIG. 5B, the dispatch computing system 162 automatically sends a camera activation signal 204c to the responder camera 116m via the network 102. The camera activation signal 204c does not pass through the computing device 112. Sending the camera activation signal 204c from the dispatch computing system 162 to the responder camera 116m without the camera activation signal 204c passing through the computing device 112 avoids any issues that may be associated with the computing device 112, such as the computing device 112 being without power (e.g., the batter of the computing device 112 is not charged), the computing device 112 not being in communication with the responder camera 116m (e.g., the computing device 112 is not paired with the responder camera 116m), and the like.

In response to receiving either the camera activation signal 204b or the camera activation signal 204c, the responder camera 116m begins capturing video. In some embodiments, video information from the video captured by the responder camera 116m is sent to the dispatch computing system 162. Examples of sending video information from the responder camera 116m to the dispatch computing system 162 are depicted in FIGS. 6A and 6B.

Figure 6A:
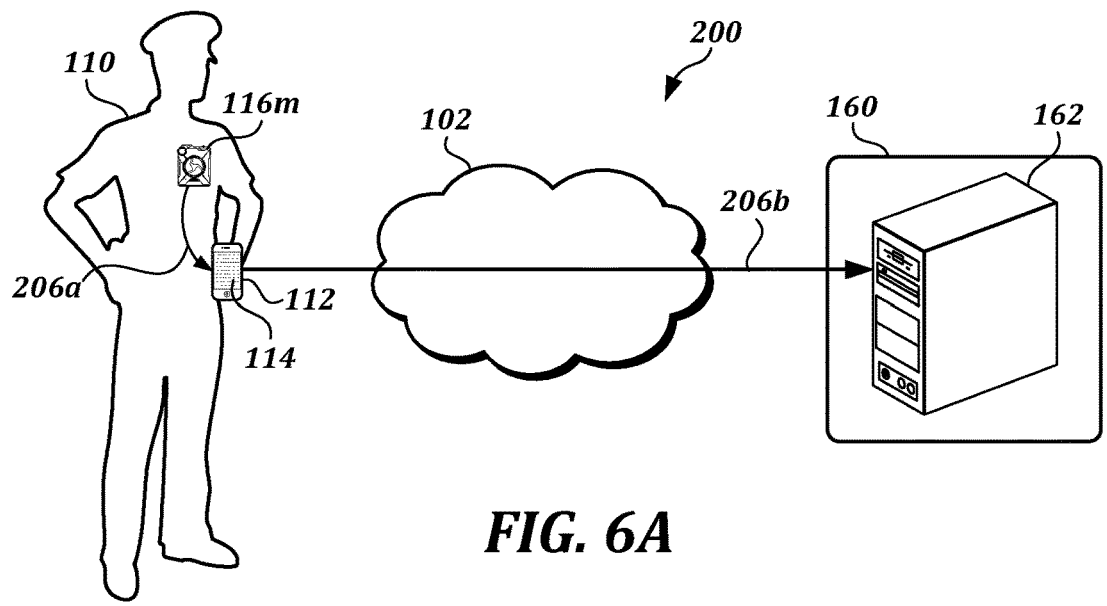
FIGS. 6A and 6B depict embodiments of sending video information from a responder camera associated with a responder to a dispatch computing system in the system depicted in FIG. 4, in accordance with the embodiments disclosed herein.

In FIG. 6A, video information 206a is sent from the responder camera 116m to the computing device 112. In some embodiments, the video information 206a is sent via a short range communication protocol, such as Bluetooth or WiFi. The computing device 112 sends the video information 206b to the dispatch computing system 162 via the network 102. In some embodiments, the video information 206b is sent via a long range communication protocol, such as 2G, 3G, 4G, LTE, or WiMAX. In the embodiment shown in FIG. 6A, the computing device 112 acts as a relay between the responder camera 116m and the dispatch computing system 162.

Figure 6B:
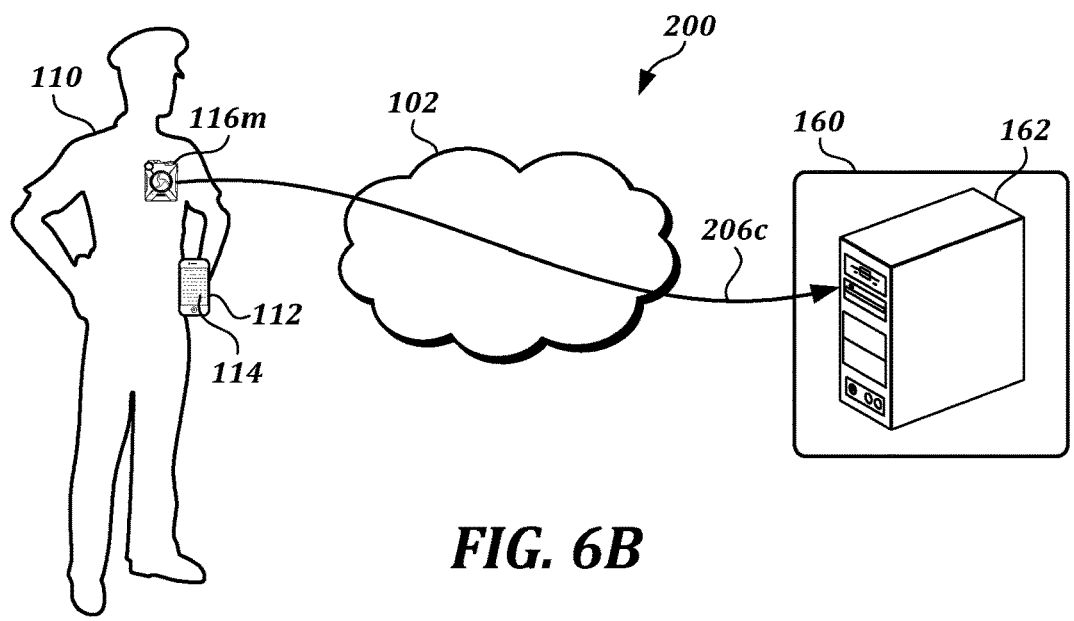

In FIG. 6B, video information 206c is sent from the responder camera 116m to the dispatch computing system 162 via the network 102. In some embodiments, the video information 206c is sent via a long range communication protocol, such as 2G, 3G, 4G, LTE, or WiMAX. In the embodiment shown in FIG. 6B, the video information 206c is sent from the responder camera 116m to the dispatch computing system 162 without the video information 206c passing through the computing device 112. This embodiment avoids any issues that may be associated with the computing device 112, such as the computing device 112 being without power, the computing device 112 not being in communication with the responder camera 116m, and the like.

In some embodiments, video information is sent from the responder camera 116m to the dispatch computing system 162 after completion of recording a video. For example, the responder camera 116m may record a video for a particular amount of time and then send the video information for the video after the recording is completed. In other embodiments, at least a portion of the video information is sent from the responder camera 116m to the dispatch computing system 162 such that the dispatch computing system 162 receives the portion of the video information before the responder camera 116m finishes recording the video. This action by the responder camera 116m is sometimes referred to as sending a "live stream" of the video or as sending a "streaming video," even though the dispatch computing system 162 may not receive the video information instantaneously as it is recorded by the responder camera 116m. Delays in receiving a live stream of a video may be due to delays in processing by the responder camera 116m, the computing device 112, and/or the dispatch computing system 162, latency in the network 102, or any other cause of delay. Both of the embodiments of sending video information from the responder camera 116m to the dispatch computing system 162 depicted in FIGS. 6A and 6B are usable to send completed videos or to send live streams of videos. In other embodiments, video information recorded by the responder camera 116m can be conveyed by wired mechanisms, such as by placing the responder camera 116m in a cradle coupled to the dispatch computing system 162 (e.g., at the end of a responder's shift upon returning to the dispatch unit 160).

Figure 6C:
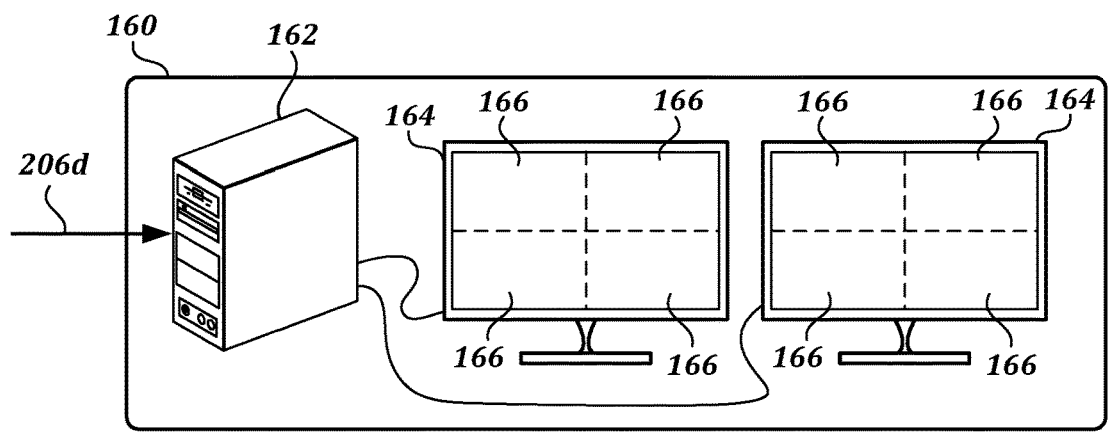
FIG. 6C depicts an embodiment of a dispatch computing system receiving and displaying video information, in accordance with the embodiments disclosed herein.

An example of the dispatch computing system 162 receiving video information 206d is depicted in FIG. 6C. As shown in FIG. 6C, the dispatch computing system 162 receives the video information 206d. The video information 206d may include video information from a single responder camera or a number of different responder cameras. In some embodiments, the dispatch computing system 162 includes at least one memory and the dispatch computing system 162 stores the received video information 206d. In some embodiments, including the embodiment depicted in FIG. 6C, the dispatch computing system 162 is coupled to one or more display devices 164 and the dispatch computing system 162 displays the received video information 206d on the one or more display devices 164. In the case where the video information 206d includes live streams of video information from a number of different responder cameras, the dispatch computing system 162 may display the live streams on different portions 166 of the one or more display devices 164. In this way, a dispatcher or other user viewing the one or more display devices 164 will be able to see the live streams from the different responder cameras at the same time.

Figure 7:
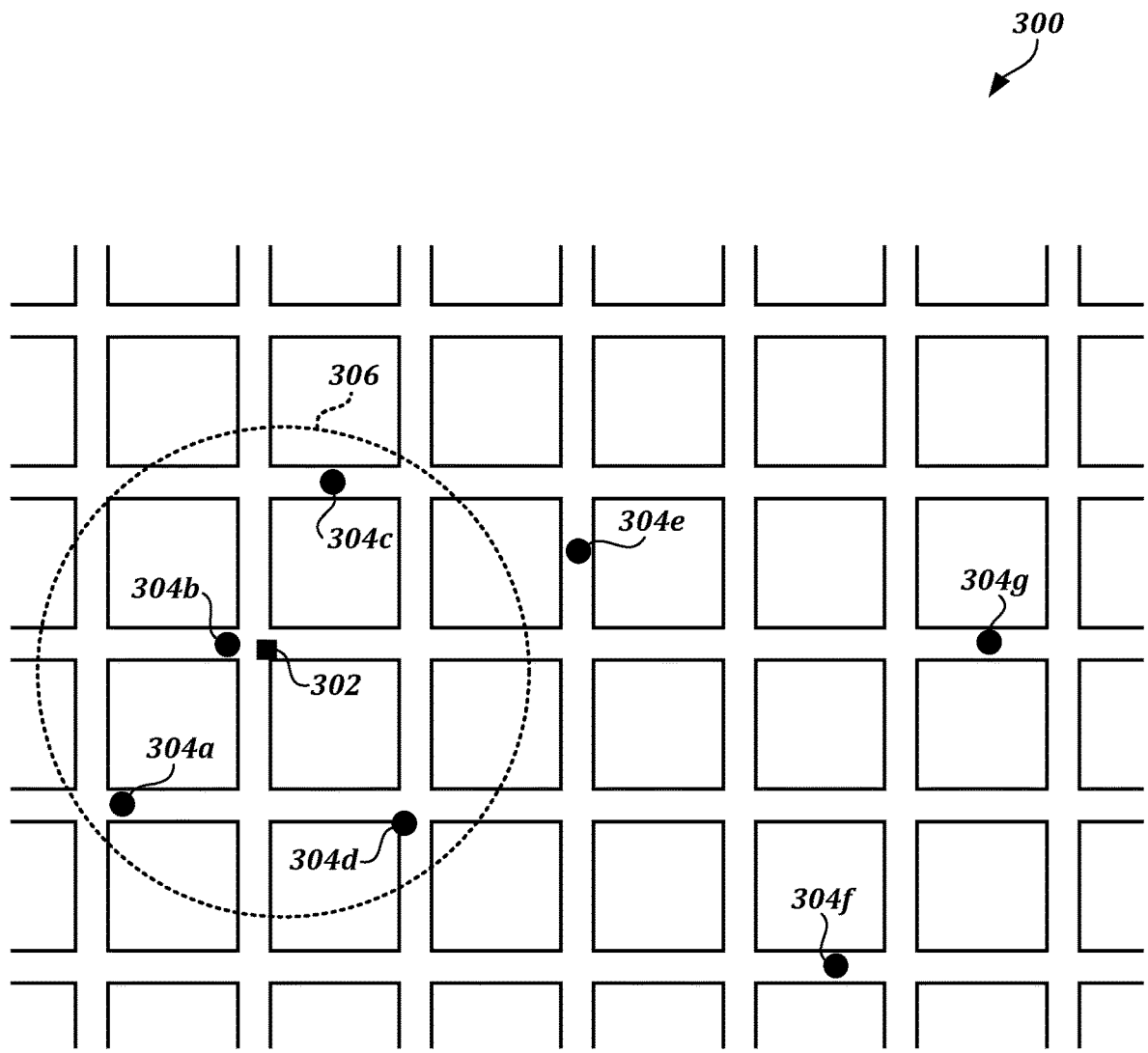
FIG. 7 depicts an embodiment of a dispatch computing device determining a geographic area associated with a location, in accordance with the embodiments disclosed herein.
Figure 8:
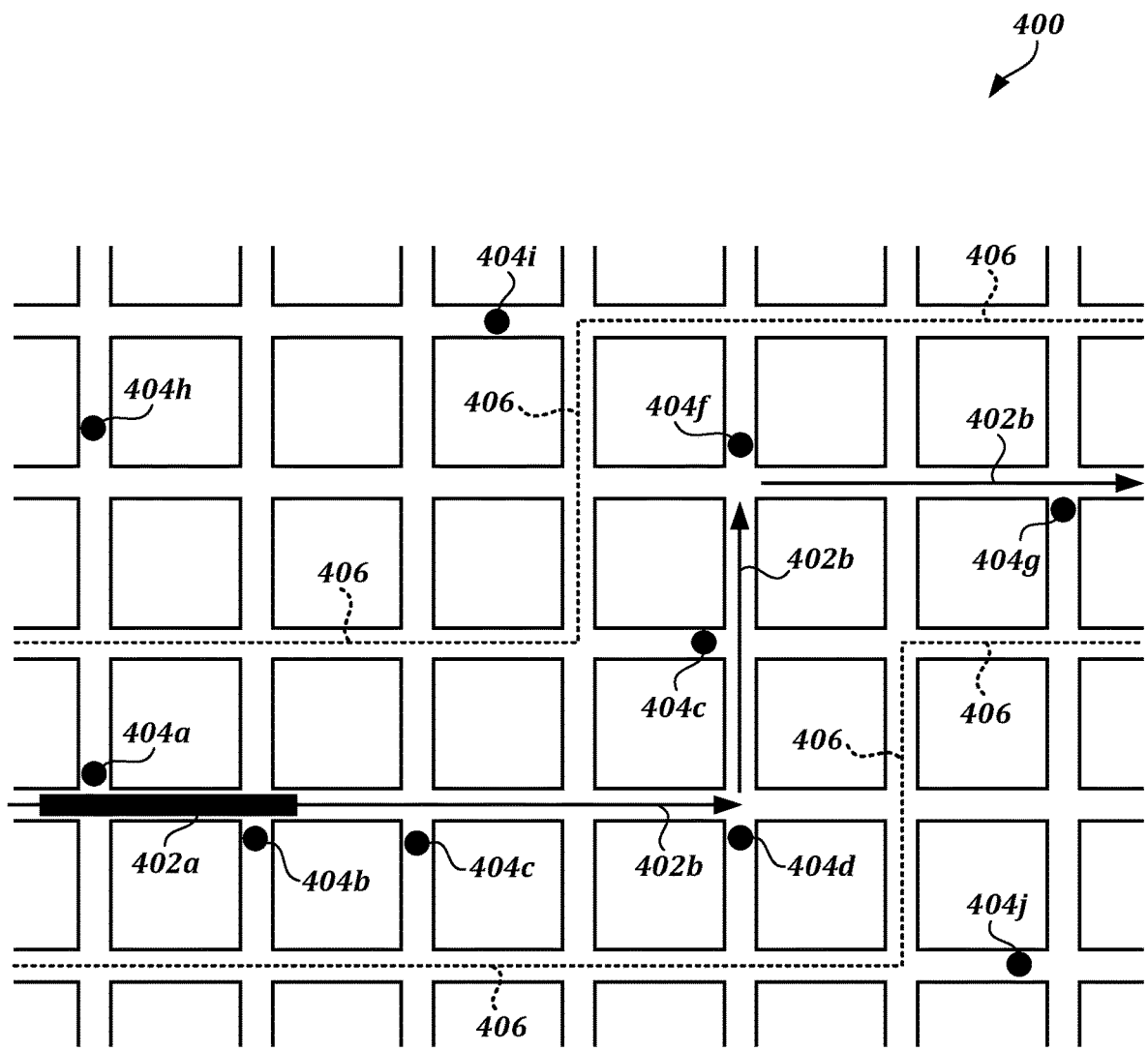
FIG. 8 depicts another embodiment of a dispatch computing device determining a geographic area associated with an event, in accordance with the embodiments disclosed herein.

Examples of a dispatch computing device determining a geographic area associated with a location or event are depicted in FIGS. 7 and 8. A map 300 is depicted in FIG. 7 with indications of a location or event 302 and responders 304a-g. In some embodiments, the location or event 302 may be a car accident, a reported crime, a person in need of medical attention, a disabled vehicle, a business, a residence, or any other location or event. In one embodiment, a dispatch computing device receives the indication of the location or event 302. In some examples, the dispatch computing device receives the indication of the location or event 302 in the form of an address, an intersection, geospatial information, or any other information that identifies the location or event. In some examples, the indication of the location or event 302 is received by the dispatch computing device from a dispatcher in communication with a responder, from a computing device of a responder, or from any other source.

The computing device determines a geographic area 306 associated with the location or event 302. In the embodiment shown in FIG. 7, the geographic area 306 is a substantially circular area within a predetermined distance of the location or event 302. In other embodiments, a geographic area associated with a location or event can have any other shape (e.g., rectangle, oval, etc.), have an irregular shape, be generated based on user preferences (e.g., a default geographic area shape or size), be based on a user input (e.g., an area drawn on a map by a user), or be generated in any other manner. In some embodiments, the geographic area represents an area of interest. In an effort to capture evidence about the geographic area 306, the dispatch computing device automatically activates responder cameras associated with one or more of the responders 304a-g in response to receiving one or more dispatch acknowledgments from the one or more of the responders 304a-g.

In one embodiment, the dispatch computing device automatically sends a camera activation signal to a responder camera associated with a responder that is at the location or event 302. For example, the responder 304b may have reported the location or event 302 and sent a dispatch acknowledgement that the responder 304b is at the location or event 302. In another embodiment, the dispatch computing device sends a dispatch request to the responder 304b prior to receiving the dispatch acknowledgement from the responder 304. The dispatch computing device automatically sends a camera activation signal to a responder camera associated with the responder 304b in response to receiving the dispatch acknowledgement from the responder 304b. The responder camera of the responder 304b is configured to begin capturing video in response to receiving the camera activation signal.

In another embodiment, the dispatch computing device automatically sends a camera activation signal to one or more responder cameras associated with one or more responders that are within the geographic area 306. For example, the responders 304a and 304c-d may have sent dispatch acknowledgements that the responders 304a and 304c-d are at their respective locations within the geographic area 306 shown in FIG. 7. The dispatch computing device automatically sends camera activation signals to responder cameras associated with the responders 304a and 304c-d in response to receiving the dispatch acknowledgements from the responders 304a and 304c-d. The responder cameras of the responders 304a and 304c-d are configured to begin capturing video in response to receiving the camera activation signals. In some embodiments, the dispatch acknowledgements from the responders 304a and 304c-304d are received before the dispatch computing device determines the geographic area 306 and the dispatch computing device sending the camera activation signals to responder cameras associated with the responders 304a and 304c-304d in response to receiving the dispatch acknowledgements from the responders 304a and 304c-304d includes sending the camera activation signals to responder cameras associated with the responders 304a and 304c-304d in response to receiving the dispatch acknowledgements from the responders 304a and 304c-304d and determining the geographic area 306.

In another embodiment, the dispatch computing device automatically sends a camera activation signal to a responder camera associated with a responder that is en route to the location or event 302. For example, the responder 304e may have sent a dispatch acknowledgement that the responder 304e is en route to the location or event 302 as backup for the responder 304b. The dispatch computing device automatically sends a camera activation signal to a responder camera associated with the responder 304e in response to receiving the dispatch acknowledgement from the responder 304e. The responder camera of the responder 304e is configured to begin capturing video in response to receiving the camera activation signal. In some embodiments, the responder camera of the responder 304e begins capturing video before the responder 304e enters the geographic area 306. In this way, video is recorded while the responder 304e is en route to the geographic area 306. In some embodiments, the dispatch computing device receives the video from the responder camera associated with the responder 304e as a streaming video, and at least a portion of the streaming video is received by the dispatch computing device from the responder camera associated with the responder 304e prior to the responder 304e arriving at the geographic area 306.

In another embodiment, the dispatch computing device automatically sends a camera activation signal to one or more responder cameras associated with one or more responders that are en route to the geographic area 306. For example, the responder 304f may have sent a dispatch acknowledgement that the responder 304f is en route to the location where responder 304d is located within the geographic area 306 as backup for responder 304d. The dispatch computing device automatically sends camera activation signals to the responder camera associated with the responder 304f in response to receiving the dispatch acknowledgement from the responder 304f The responder camera of the responder 304f is configured to begin capturing video in response to receiving the camera activation signal. Even though the responder 304f is not en route to the location or event 302, the responder 304f is en route to the geographic area 306 and video captured by the responder camera of the responder 304f may assist with the efforts of responders responding to the location or event 302. In some embodiments, the dispatch computing device receives the video from the responder camera associated with the responder 304f as a streaming video, and at least a portion of the streaming video is received by the dispatch computing device from the responder camera associated with the responder 304f prior to the responder 304f arriving at the geographic area 306.

A map 400 is depicted in FIG. 8 with indications of an event in the form of a parade 402a, a parade route 402b, and responders 404a-j. In one embodiment, a dispatch computing device receives the indication of the parade route 402b.

In some examples, the dispatch computing device receives the indication of the parade route 402b in the form of a series of addresses, a series of intersections, geospatial information data of the parade route 402b, or any other information that identifies the parade route 402b. In some examples, the indication of the parade route 402b is received by the dispatch computing device from a staff person at a responder agency (e.g., police department staff) or from any other source.

The computing device determines a geographic area 406 associated with the parade route 402b. In the embodiment shown in FIG. 8, the geographic area 406 parallels the parade route 402b within a predetermined distance of the parade route 402b. In some embodiments, the geographic area 406 represents an area of interest. In an effort to capture evidence about the geographic area 406, the dispatch computing device automatically activates responder cameras associated with one or more of the responders 404a-j in response to receiving one or more dispatch acknowledgements from the one or more of the responders 404a-j.

In one embodiment, the dispatch computing device automatically sends a camera activation signal to one or more responder cameras associated with one or more responders that are within the geographic area 406. For example, the responders 404a-g may have sent dispatch acknowledgements that the responders 404a-g are at their respective locations within the geographic area 406 shown in FIG. 7. The dispatch computing device automatically sends camera activation signals to responder cameras associated with the responders 404a-g in response to receiving the dispatch acknowledgements from the responders 404a-g. The responder cameras of the responders 404a-g are configured to begin capturing video in response to receiving the camera activation signals. In some embodiments, the dispatch acknowledgements from the responders 404a-g are received before the dispatch computing device determines the geographic area 406 and the dispatch computing device sending the camera activation signals to responder cameras associated with the responders 404a-g in response to receiving the dispatch acknowledgements from the responders 404a-g includes sending the camera activation signals to responder cameras associated with the responders 404a-g in response to receiving the dispatch acknowledgements from the responders 404a-g and determining the geographic area 406.

In another embodiment, the dispatch computing device automatically sends a camera activation signal to one or more responder cameras associated with one or more responders that are en route to the geographic area 406. For example, the responder 404j may have been informed that responder 404d requires assistance and the responder 404j may have sent a dispatch acknowledgement that the responder 404j is en route to the location where responder 404d is located within the geographic area 406. The dispatch computing device automatically sends camera activation signals to the responder camera associated with the responder 404j in response to receiving the dispatch acknowledgement from the responder 404d. The responder camera of the responder 404d is configured to begin capturing video in response to receiving the camera activation signal.

While the embodiments depicted in FIGS. 7 and 8 include particular scenarios, such as the parade 402a and the parade route 402b depicted in FIG. 8, the concepts discussed above with respect to FIGS. 7 and 8 apply to any number of other stations. In one example, the embodiment discussed above with respect to FIG. 7 can be adapted for larger events, such as a sporting event, a fair, a demonstration, or any other event. In some embodiments, an event may take place over a larger area (e.g., over one or more city blocks) and the dispatch computing device determines a geographic area associated with the event based on the larger area of the event itself. In another example, the embodiment discussed above with respect to FIG. 8 can be adapted for other events that have a route, such as a vehicle chase with an anticipated chase route, a funeral processional with an expected route, or any other event that occurs over a route. In some embodiments, the dispatch computing device determines the geographic area based on a probability of an event taking a particular route (e.g., determining a geographic area associated with a vehicle chase based on a probability of the vehicle taking a particular route).

Figure 9:
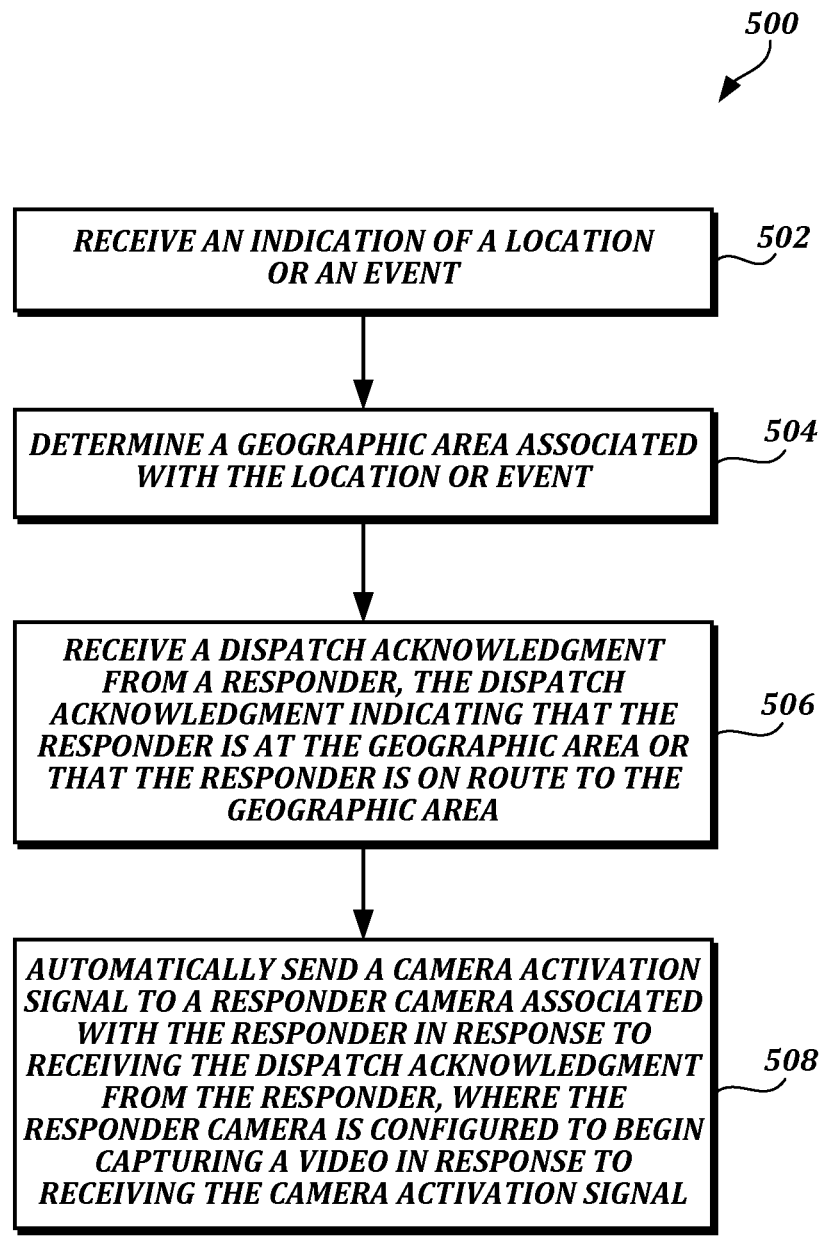
FIG. 9 depicts an embodiment of a method performed by a computing device to automatically activate a responder camera, in accordance with the embodiments disclosed herein.

An embodiment of a method 500 performed by a computing device to automatically activate a responder camera is depicted in FIG. 9. At block 502, the computing device receives an indication of a location or an event. As described above, the indication can be received from a responder computing device via a network, from a dispatcher in communication with a responder, from a responder agency staff member, or from any other source. At block 504, the computing device determines a geographic area associated with the location or event. As described above, the geographic area can be a regular shape, an irregular shape, a user-defined area, a predetermined distance from the location or event, or any other geographic area associated with the location or event.

At block 506, the computing device receives a dispatch acknowledgement from a responder, where the dispatch acknowledgement indicates that the responder is at the geographic area or that the responder is en route to the geographic area. As described above, the dispatch acknowledgement can be received from a responder computing device via a network, from a dispatcher entering the dispatch acknowledgement in response to a communication between the responder and the dispatcher, or from any other source conveying the dispatch acknowledgement from the responder. At block 508, the computing device automatically sends a camera activation signal to a responder camera associated with the responder in response to receiving the dispatch acknowledgement from the responder. The responder camera is configured to begin capturing a video in response to receiving the camera activation signal. As described above, the camera activation signal may be sent from the computing device to the responder camera via a network, from the computing device to a responder computing device where the responder computing device is configured to relay the camera activation signal to the responder camera, or from the computing device to the responder camera in any other way.

Unless otherwise specified in the context of specific examples, described techniques and tools may be implemented by any suitable computing device or set of computing devices.

In any of the described examples, a data store contains data as described herein and may be hosted, for example, by a database management system (DBMS) to allow a high level of data throughput between the data store and other components of a described system. The DBMS may also allow the data store to be reliably backed up and to maintain a high level of availability. For example, a data store may be accessed by other system components via a network, such as a private network in the vicinity of the system, a secured transmission channel over the public Internet, a combination of private and public networks, and the like. Instead of, or in addition to a DBMS, a data store may include structured data stored as files in a traditional file system. Data stores may reside on computing devices that are part of or separate from components of systems described herein. Separate data stores may be combined into a single data store, or a single data store may be split into two or more separate data stores.

Some of the functionality described herein may be implemented in the context of a client-server relationship. In this context, server devices may include suitable computing devices configured to provide information and/or services described herein. Server devices may include any suitable computing devices, such as dedicated server devices. Server functionality provided by server devices may, in some cases, be provided by software (e.g., virtualized computing instances or application objects) executing on a computing device that is not a dedicated server device. The term "client" can be used to refer to a computing device that obtains information and/or accesses services provided by a server over a communication link. However, the designation of a particular device as a client device does not necessarily require the presence of a server. At various times, a single device may act as a server, a client, or both a server and a client, depending on context and configuration. Actual physical locations of clients and servers are not necessarily important, but the locations can be described as "local" for a client and "remote" for a server to illustrate a common usage scenario in which a client is receiving information provided by a server at a remote location.

Figure 10:
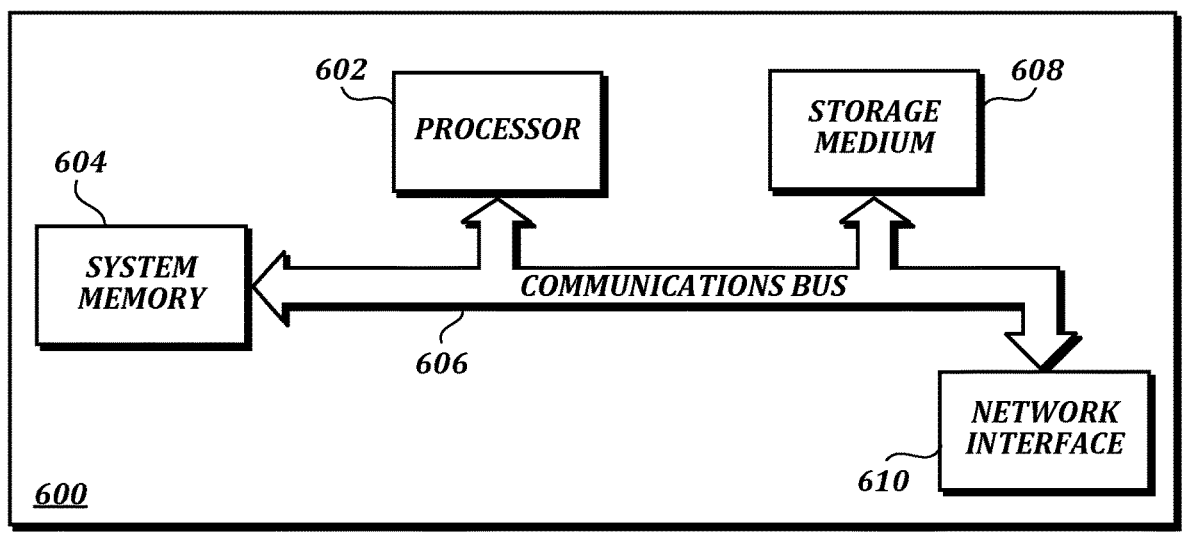
FIG. 10 depicts a block diagram that illustrates aspects of an illustrative computing device appropriate for use in accordance with embodiments of the present disclosure.

FIG. 10 depicts a block diagram that illustrates aspects of an illustrative computing device 600 appropriate for use in accordance with embodiments of the present disclosure. The description below is applicable to servers, personal computers, mobile phones, smart phones, tablet computers, embedded computing devices, and other currently available or yet to be developed devices that may be used in accordance with embodiments of the present disclosure.

In its most basic configuration, the computing device 600 includes at least one processor 602 and a system memory 604 connected by a communication bus 606. Depending on the exact configuration and type of device, the system memory 604 may be volatile or nonvolatile memory, such as read only memory ("ROM"), random access memory ("RAM"), EEPROM, flash memory, or other memory technology. Those of ordinary skill in the art and others will recognize that system memory 604 typically stores data and/or program modules that are immediately accessible to and/or currently being operated on by the processor 602. In this regard, the processor 602 may serve as a computational center of the computing device 600 by supporting the execution of instructions.

As further illustrated in FIG. 10, the computing device 600 may include a network interface 610 comprising one or more components for communicating with other devices over a network. Embodiments of the present disclosure may access basic services that utilize the network interface 610 to perform communications using common network protocols. The network interface 610 may also include a wireless network interface configured to communicate via one or more wireless communication protocols, such as WiFi, 2G, 3G, 4G, LTE, WiMAX, Bluetooth, and/or the like.

In the illustrative embodiment depicted in FIG. 10, the computing device 600 also includes a storage medium 608. However, services may be accessed using a computing device that does not include means for persisting data to a local storage medium. Therefore, the storage medium 608 depicted in FIG. 10 is optional. In any event, the storage medium 608 may be volatile or nonvolatile, removable or non-removable, implemented using any technology capable of storing information such as, but not limited to, a hard drive, solid state drive, CD ROM, DVD, or other disk storage, magnetic tape, magnetic disk storage, and/or the like.

As used herein, the term "computer-readable medium" includes volatile and nonvolatile and removable and non-removable media implemented in any method or technology capable of storing information, such as computer-readable instructions, data structures, program modules, or other data. In this regard, the system memory 604 and storage medium 608 depicted in FIG. 10 are examples of computer-readable media.

For ease of illustration and because it is not important for an understanding of the claimed subject matter, FIG. 10 does not show some of the typical components of many computing devices. In this regard, the computing device 600 may include input devices, such as a keyboard, keypad, mouse, trackball, microphone, video camera, touchpad, touchscreen, electronic pen, stylus, and/or the like. Such input devices may be coupled to the computing device 600 by wired or wireless connections including RF, infrared, serial, parallel, Bluetooth, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computing device 600 (e.g., a client device), or can be integral components of the computing device 600. In some embodiments, multiple input devices may be combined into a single, multifunction input device (e.g., a video camera with an integrated microphone). The computing device 600 may also include output devices such as a display, speakers, printer, etc. The output devices may include video output devices such as a display or touchscreen. The output devices also may include audio output devices such as external speakers or earphones. The output devices can be separate from and communicatively coupled to the computing device 600, or can be integral components of the computing device 600. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™, PHP, Perl, Python, Ruby, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub modules. The computing logic can be stored in any type of computer-readable medium (e.g., a non-transitory medium such as a memory or storage medium) or computer storage device and be stored on and executed by one or more general purpose or special purpose processors, thus creating a special purpose computing device configured to provide functionality described herein.

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

Embodiments disclosed herein include a computer-implemented method for performing one or more of the above-described techniques; a computing device comprising a processor and computer-readable storage media having stored thereon computer executable instructions configured to cause the server computer to perform one or more of the above described techniques; a computer-readable storage medium having stored thereon computer executable instructions configured to cause a computing device to perform one or more of the above-described techniques; a computing system comprising a server that provides one or more of the above-described services. The computer system may further comprise plural client computing devices; and a client computing device in communication with a server that provides one or more of the above-described services, the client computing device comprising a processing unit and computer-readable storage media having stored thereon computer executable instructions configured to cause the client computing device to perform one or more of the above described techniques.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

What is claimed is:

1. A method for activating recording, the method comprising:
   receiving, by at least one computing device, an indication of an event from a first responder computing device associated with a first responder;
   determining, by the at least one computing device, a geographic area associated with the event;
   receiving, by the at least one computing device, a dispatch acknowledgement indicating that a second responder is at the geographic area or that the second responder is en route to the geographic area;
   in response to receiving the dispatch acknowledgement and determining the geographic area, automatically sending, by the at least one computing device, a camera activation signal to a responder camera associated with the second responder; and
   receiving, by the at least one computing device, video from the responder camera, wherein the first responder is different from the second responder and the responder camera is configured to automatically send the video in response to receiving the camera activation signal.

2. The method of claim 1, wherein the dispatch acknowledgement is received over a network from a second responder computing device associated with the second responder.

3. The method of claim 2, wherein the second responder computing device comprises a two-way radio.

4. The method of claim 2, wherein the dispatch acknowledgement is received from the second responder computing device responsive to an input received by the second responder computing device from the second responder accepting dispatch instructions to respond to the event or to respond to the geographic area.

5. The method of claim 1, wherein the at least one computing device includes a client computing device and the dispatch acknowledgement is entered into the client computing device by a third responder different from the first responder and the second responder.

6. The method of claim 1, wherein the camera activation signal is sent to the responder camera via a network without the camera activation signal passing through a second responder computing device from which the dispatch acknowledgement is received by the at least one computing device.

7. The method of claim 1, wherein receiving the indication of the event comprises receiving an indication from a light bar of a vehicle that the light bar has been activated, an indication from a holster that the holster has been unlocked to allow removal of a firearm, or an indication from a biometric sensor of biometric data about the first responder.

8. The method of claim 1, further comprising:
   receiving, by the at least one computing device, a second dispatch acknowledgement indicating that the first responder is at the geographic area;
   in response to receiving the second dispatch acknowledgement and determining the geographic area, automatically sending, by the at least one computing device, a second camera activation signal to a second responder camera associated with the first responder; and receiving, by the at least one computing device, second video from the second responder camera.

9. The method of claim 8, further comprising displaying, on one or more display devices coupled to the at least one computing device, live streams of video information from each of the responder camera and the second responder camera at a same time.

10. The method of claim 1, wherein the dispatch acknowledgement indicates that the second responder is en route to the geographic area.

11. The method of claim 10, wherein receiving the dispatch acknowledgement includes receiving geospatial information indicating an intended destination of the second responder.

12. The method of claim 1, wherein receiving the video comprises receiving the video after recording of the video is completed.

13. The method of claim 1, further comprising storing, by the at least one computing device, the video, and wherein receiving the video comprises receiving at least a portion of the video from the responder camera before the responder camera finishes capturing the video.

14. The method of claim 1, wherein sending the camera activation signal comprises sending, by the at least one computing device, the camera activation signal from the at least one computing device to the responder camera using a wireless communication protocol, wherein the responder camera is configured to automatically send the video in response to receiving the camera activation signal from the at least one computing device.

15. A computing system for activating recording, the computing system comprising:
a processor; and
a computer-readable medium having instructions embodied thereon, wherein the instructions, in response to execution by the processor, cause the computing system to perform operations comprising:
receiving an indication of an event from a first responder computing device associated with a first responder;
determining a geographic area associated with the event;
receiving a dispatch acknowledgement indicating that a second responder is en route to the geographic area;
in response to receiving the dispatch acknowledgement and determining the geographic area, sending a camera activation signal to a responder camera associated with the second responder; and
receiving video from the responder camera, wherein the first responder is different from the second responder and the responder camera is configured to automatically send the video in response to receiving the camera activation signal.

16. The computing system of claim 15, wherein the operations further comprise receiving, from the first responder computing device, an indication from a light bar of a vehicle that the light bar has been activated, an indication from a holster that the holster has been unlocked to allow removal of a firearm, or an indication from a biometric sensor of biometric data about the first responder.

17. The computing system of claim 15, wherein the dispatch acknowledgement includes geospatial information indicating an intended destination of the second responder.

18. The computing system of claim 15, further comprising an input device, wherein determining the geographic area comprises determining the geographic area based on a user input received via the input device, and wherein the user input comprises an area drawn on a map by a user.

19. A non-transitory computer readable medium having instructions embodied thereon for activating recording, wherein the instructions, in response to execution by a computing system, cause the computing system to perform operations comprising:
receiving an indication of an event from a first responder computing device associated with a first responder;
determining a geographic area associated with the event;
receiving information as a dispatch acknowledgement, wherein the information indicates that a second responder is en route to the geographic area;
in response to receiving the dispatch acknowledgement and determining the geographic area, automatically sending a camera activation signal to a responder camera associated with the second responder; and
receiving video from the responder camera, wherein the first responder is different from the second responder and the responder camera is configured to send the video in response to receiving the camera activation signal.

20. The non-transitory computer readable medium of claim 19, wherein receiving the information comprises receiving the information entered via an input device of the computing system, and wherein the information is entered with an indication that the second responder is en route to the geographic area.

* * * * *